Aug. 2, 1966  W. F. DONOVAN  3,263,564
IMPULSE VALVE
Filed Dec. 22, 1964  2 Sheets-Sheet 1
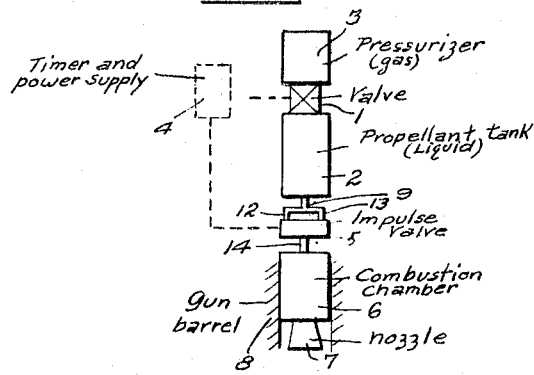
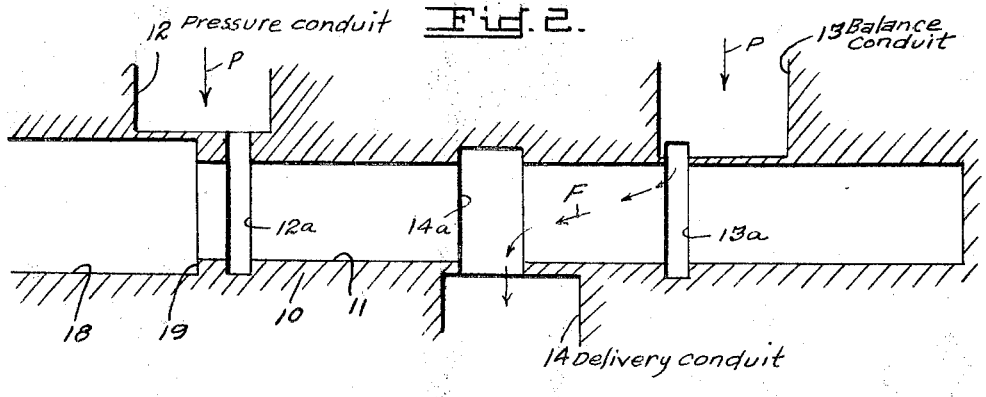
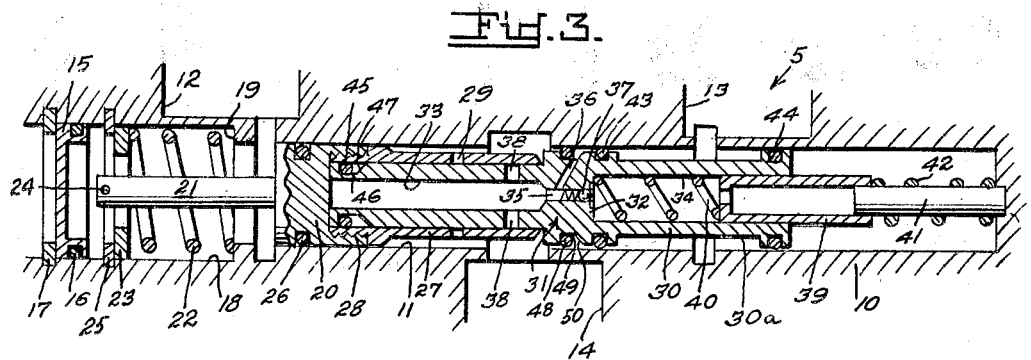
INVENTOR
William F. Donovan
BY: Harry M. Saragovitz,
Edward J. Kelly &
Herbert Berl  ATTORNEYS.

Aug. 2, 1966  W. F. DONOVAN  3,263,564
IMPULSE VALVE
Filed Dec. 22, 1964  2 Sheets-Sheet 2

INVENTOR,
William F. Donovan

BY: Harry M. Saragovitz,
Edward J. Kelly &
Herbert Berl

ATTORNEYS.

United States Patent Office 3,263,564
Patented August 2, 1966

3,263,564
IMPULSE VALVE
William F. Donovan, Aberdeen, Md., assignor to the United States of America as represented by the Secretary of the Army
Filed Dec. 22, 1964, Ser. No. 420,467
5 Claims. (Cl. 89—1.8)

The invention described herein may be manufactured and used by or for the Government for governmental purposes without the payment to me of any royalty thereon.

This invention relates to an impulse valve and more particularly to a valve for use in the fuel system of a liquid propellant rocket that is fired from a gun or like launcher.

The valve of the invention is designed to eliminate operating elements that are located separately and remotely from the rocket's fuel system and which elements add to the complexity and obvious unreliability of the operation thereof.

The valve of this invention is responsive to hydrostatic pressure that is generated by the set-back forces of the gun to apply a predetermined amount of pressure to first, position the operating elements of the valve in a bore-safe position while still in the gun barrel whereby the valve will be fully opened by a second application of pressure from pressurized propellant after the rocket has left the gun barrel.

A primary object of this invention is to admit fuel from a pressurized propellant tank to the combustion chamber of a rocket's fuel system.

It is another object to eliminate the need for an associated and necessarily precise timer and battery or other power supply in a liquid propellant rocket's system to prevent destruction of the rocket due to malfunctions thereof.

A further object of this invention is to provide a time-delay in the firing of a rocket from a gun.

A still further object is to hydrostatically position a valve while in the barrel of a gun whereby it can be fully opened upon pressure from the rocket's propellant after the rocket is a safe distance from the gun barrel.

A final object of this invention is to substitute a hydrostatic responsive valve for the dangerous and unreliable explosive admission valve in the fuel system of a liquid propellant rocket's system.

The specific nature of the invention as well as other objects and advantages thereof, will clearly appear from a description of a preferred embodiment as shown in the accompanying drawings:

FIG. 1 is a block diagram showing a liquid rocket system including the impulse valve of the invention;

FIG. 2 is a schematic cross section view showing the arrangement of ports in the valve housing of the invention;

FIG. 3 is a similar view with the operating elements of the valve in their static condition;

Figure 4:
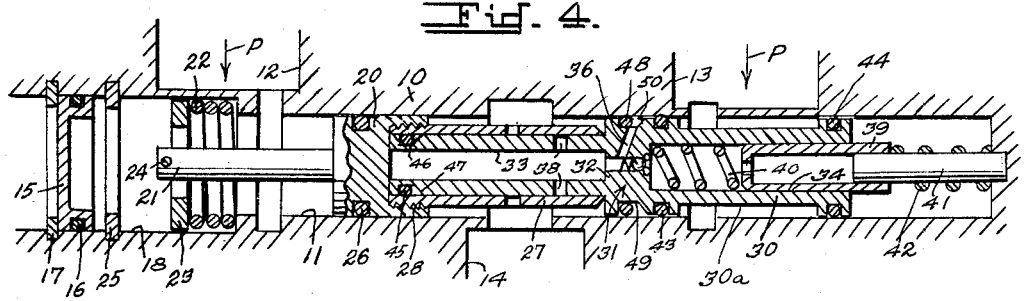
FIG. 4 is a similar view of the valve elements in the position they assume in the set-back phase.
Figure 5:
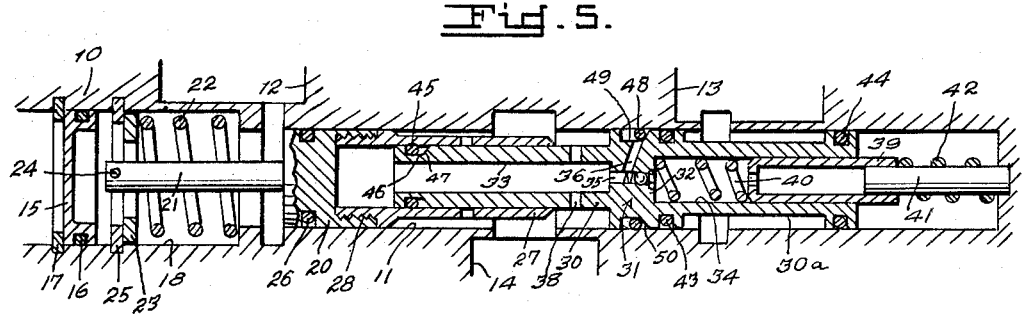
FIG. 5 is a similar view of the valve in the deceleration phase.
Figure 6:
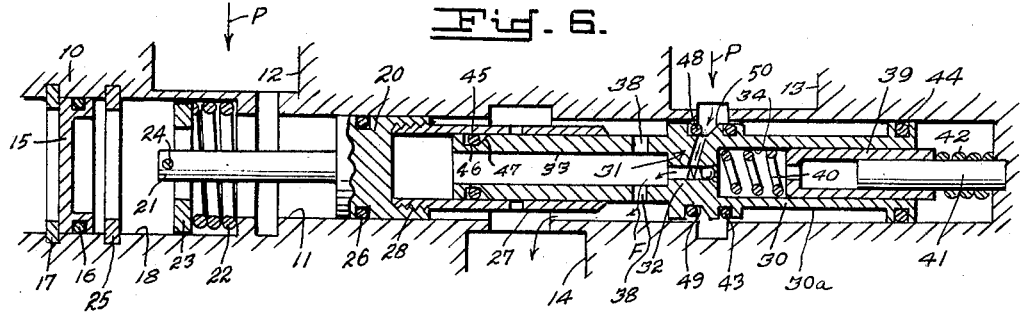
FIG. 6 is a view of the valve in its pressurization phase and fully open to permit full fluid flow from the propellant tank to the combustion chamber of the rocket's fuel system; and, FIG. 7 is an enlarged detail of the action of the O-rings in holding the valve piston and valve spool in positions in the valve bore.

Referring to the drawings, there is shown schematically in FIG. 1, a typical liquid propellant rocket and its fuel system. Reference character 1 indicates a valve, 2 a propellant tank, 3 a reservoir of pressurized gas, 4 a remotely located timing device (shown in dotted lines) and power supply, 5 the impulse valve of the invention, 6 a combustion chamber, 7 the rocket's nozzle, and 8 a portion of a gun barrel or like launching medium for launching a rocket.

The operation of the type system shown in FIG. 1 is as follows: timer 4 opens valve 1 which permits pressurized gas in reservoir 3 to pressurize propellant in tank 2. Timer 4 also opens an explosive valve (same position as valve 5) to permit flow of the propellant from tank 2 to flow into combustion chamber 6 where it is burned.

The timer 4 was formerly located outside of and positioned remotely from the rocket itself and served to open valve 1 and fire the explosive valve (not shown) for completing the fuel flow. These functions had to be at a precise, predetermined time interval and the operation thereof was necessarily critical since any malfunction of operation could result in destruction of the rocket in mid-course or even in the gun barrel 8. It also must be designed to withstand the "g" forces generated by the firing of the gun.

Timer 4 is shown in dotted lines in FIG. 1 since it is now eliminated by valve 5 of this invention and is responsive to the reaction forces acting on the rocket while it is still in the gun 8 to hydraulically position the valve 5 for automatic opening upon application of the pressurization of the propellant tank 2.

Valve 5 is located between the propellant tank 2 and the combustion chamber 6 as shown in FIG. 1 and may consist of a housing 10, usually a cylinder, etc., having a central bore 11; a pressure conduit 12; an annular pressure port 12a; a balance conduit 13; an annular balance port 13a; a delivery conduit 14 and an annular delivery port 14a. Conduit 14 is located midway between conduits 12 and 13. Conduits 12 and 13 may be interconnected to form a single conduit as at 9 which leads to tank 2. Delivery conduit 14 leads to combustion chamber 6. Bore 11 is counterbored as at 18 to form a shoulder 19 for a purpose to be later described. Bore 11 is closed at one end, its other end being closed by a seal cap 15 having an O-ring 16. Cap 15 is secured against "blow-out" by a snap ring 17 (see FIGS. 3–6).

The operating elements of the valve comprise an assembly consisting of a drive piston 20 having a reduced stem portion 21 extending therefrom towards cap 15 and is slidable in bore 11.

A return spring 22 is positioned in counterbore 18 encircling stem 21 and biases between a spring retainer 23 and shoulder 19 to normally urge the valve assembly towards cap 15. Spring retainer 23 has its movement with respect to stem 21 restrained in one direction by a pin 24 and a snap ring 25 limits axial movement of the spring retainer 23 towards the cap 15.

A sealing O-ring 26 provides a seal between drive piston 20 and bore 11. A tubular piston sleeve 27 is threadably engaged as at 28 to valve piston 20 and has a diameter somewhat less than that of the valve piston 20 as shown. This sleeve is provided with radial pressure relief ports 29. A tubular valve spool 30 having an annular reduced portion 30a is slidably mounted in bore 11 and one end thereof is slidable in piston sleeve 27. A "control" portion 31 is disposed medially of valve spool 30 and consists of a wall 32 dividing the tubular spool into two equal bores 33 and 34.

Wall 32 is axially bored as at 35 and obliquely as at 36. A spring-pressed pressure relief check valve 37 is located in axial bore 35. The valve spool 30 is also radially bored as at 38.

The other end of valve spool 30 receives a tubular spool guide 39 slidable therein and the guide 39 is biased into spool guide 30 by a spring 40 encircling a guide post 41. The guide post 41 is secured at one of its ends in valve body 10.

Figure 7:
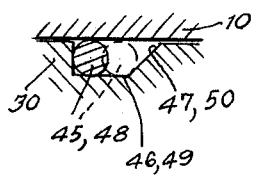

Means for momentarily holding spool guide 30 in "stepped" positions in bore 11 and also in piston sleeve 27 are provided. Both means consists of O-rings 45 and 48 in annular grooves 46 and 49. As the spool 30 moves in bore 11 pressure from springs 40 and 42 will tend to bias spool 30 in the opposite direction, and when pressure ceases, O-rings 45 and 48 tend to ride up on beveled walls 47 and 50 and "jam" between the beveled wall 47 and bore 11, thus momentarily holding the spool 30 against axial movement in the bore 11. This action is clearly illustrated in FIG. 7 wherein the dotted position shows the O-ring in its "jammed" position.

Operation

Valve 5 is telescopic in its action and moves through three "stepped" phases before it reaches its fully opened position.

As seen in FIG. 3, the valve is static, and in this state, valve 5 is of course, closed and also is valve 1 of the fuel system. Tank 2 contains liquid propellant which fills conduits 12, 13, ports 12a, 13a, bore 18 and the annular portion 30a of the valve spool 30.

The first phase is the "set-back" (see FIG. 4) phase, and in this phase movement of the drive piston 20 and valve spool 30 is initiated by the set-back forces generated by the firing of gun 8 which causes drive piston 20 to advance until stopped by shoulder 19. Pressure occurs as shown by arrows P in FIG. 4 but no flow of propellant occurs.

The valve will be in its second, or "deceleration" phase (FIG. 5) when the missile has left gun 8. The set-back forces become zero and return spring 22 returns drive piston 20 to its original position and valve spool 30 is held in position by O-ring 48. At this stage there is no hydrostatic pressure nor propellant flow and the valve is in a "bore-safe" position, ready for the next phase.

Valve 5 reaches its third or "pressurization" phase when valve 1 of the system is opened, by means not shown to permit pressurized gas to pressurize the propellant in tank 2, conduits 12, 13 and ports 12a and 13a. Again, piston 20 and valve spool 30 is advanced by propellant pressure on the drive piston and in the annular portion 30a. When O-ring seal 43 advances beyond balance port 13a the valve is fully open and propellant will flow through oblique passage 36, through ports 38 and into delivery conduit 14 to the combustion chamber 6 of the rocket. The hydraulic forces acting on the drive piston 20 are now in balance and spring 22 will return piston 20 to its original position. Piston 20 and spool 30 are held in separated positions by O-rings 45 and the propellant pressure.

Thus the valve 5 of this invention provides a time delay for actual burning of the propellant until the rocket is a safe distance from the gun 8. The valve of the invention is readily adaptable to other uses wherever a control "stepping" function is required. As an example, it could be employed as a hydraulic regulator or governor for high speed turbines, pumps, since the initial start up could set up the valve spool 30 and any consequent shut down would release the drive piston 20. A restart without mechanical attention would be prevented by the second application of pressure to the drive piston. Another auxiliary application could be in connection with the prevention of duplicate counting or reading in automatic machinery. Another use could be a part of a weighing system for heavy trucks, etc., such that any attempt to back the vehicle off the scale and reweigh it would trip spool 30 past the balance conduit and invalidate the reading.

It is apparent that the valve of the invention has unlimited applications.

Variations and modifications may be effected without departing from the scope of the novel concept of the present invention as set forth in the appended claims.

What is claimed is:

1. An impulse valve for admitting liquid propellant from a propellant supply tank to the combustion chamber of a liquid propellant rocket adapted to be fired from a gun, comprising a valve body having first and second longitudinally spaced inlet conduits communicating between the propellant tank and a discharge conduit communicating between said bore and the combustion chamber, a pair of valve operating members slidable in said bore and being responsive to a first application of pressure thereon to slide to a bore-safe position in said bore and to slide to a fully open position upon a second application thereon whereby said valve is open to permit full flow of propellant from the tank into the combustion chamber.

2. An impulse valve for admitting pressurized propellant from a tank to the combustion chamber of a liquid propellant rocket adapted to be fired from a gun barrel comprising a valve body having a bore therein, a pair of spaced inlet conduits communicating between the tank and said bore and a discharge port communicating between said bore and said combustion chamber and a pair of valve operating elements slidable in said bore; said elements adapted to be initially moved into a bore safe position in said bore by the application of hydrostatic pressure generated by set-back forces of said gun while said rocket is in the barrel of said gun whereby said valve operating elements may be automatically moved into a position in said bore whereby said valve is fully open upon application of propellant pressure from the tank when said rocket has left the barrel of said gun.

3. An impulse valve as set forth in claim 2 wherein said valve operating elements comprises a spring biased drive piston slidable in said bore and normally adjacent one of said inlet conduits and a spring biased valve spool slidable in said bore and having an annular reduced portion thereon and in communication with the other of said inlet conduits, there being passageways piercing said spool whereby when said valve has moved to said fully opened position, propellant will flow through said spool to said discharge conduit.

4. An impulse valve for automatically admitting pressurized liquid propellant from a tank to the combustion chamber of a liquid propellant rocket adapted to be fired from a gun barrel comprising a valve body having a bore therein, there being first and second conduits communicating between said tank and said bore and a discharge conduit communicating between said bore and the combustion chamber of the rocket, said discharge conduit being disposed midway of said first and second conduits, a pair of spring biased, telescoping valve operating members slidable in said bore and disposed substantially between said inlet conduits, said operating elements adapted to slide into a bore-safe position in said bore upon hydrostatic pressure in said first conduit upon hydrostatic pressure generated therein by set-back forces of said gun while said rocket is still in said barrel and to be automatically moved into a second position in said bore whereby said valve is fully open, said movement of said valve operating elements occurring upon a second pressure applied by the pressurized propellant from said tank.

5. In combination with a liquid propellant fuel system of a rocket adapted to be fired from the barrel of a gun, said system including a reservoir of pressurized gas, a fuel tank, a valve for admitting said gas into said tank, a combustion chamber and an impulse valve for admitting propellant to said combustion chamber automatically when said propellant is pressurized by gas from said reservoir, said impulse valve comprising a valve body having a bore therein, a pressure conduit connecting said bore with said tank, a balance conduit spaced from said pressure conduit and connecting said bore with said tank and a discharge conduit connecting said bore with the combustion chamber, a spring biased drive piston slidable in said bore and disposed adjacent said pressure port and a spring biased valve spool slidable in said bore and in telescoping engagement with said drive piston, there being an annular reduced portion in the peripheral surface of said spool and being in communication with said balance port, said drive piston adapted to move said valve spool into a first position in said bore when hydrostatic pressure occurs in said pressure conduit due to set-back forces generated by said gun whereby said spool will be automatically moved into a second position in said bore to fully open said valve when propellant is pressurized in said tank by said valve between said reservoir and said tank.

No references cited.

BENJAMIN A. BORCHELT, *Primary Examiner.*

S. W. ENGLE, *Assistant Examiner.*